(12) United States Patent
Bartlett et al.

(10) Patent No.: US 6,910,610 B2
(45) Date of Patent: Jun. 28, 2005

(54) CONVEYOR FOR AIR-FILLED PACKING PILLOWS

(75) Inventors: Chris Charles Bartlett, Mississauga (CA); Eric C. Morales, Hackensack, NJ (US); Gordon C. Livey, Toronto (CA); Chiu-Leung Man, North York (CA)

(73) Assignee: Cantar/Polyair Inc., Toronto (CA)

( * ) Notice: Subject to any disclaimer, the term of this patent is extended or adjusted under 35 U.S.C. 154(b) by 0 days.

(21) Appl. No.: 10/724,782

(22) Filed: Dec. 1, 2003

(65) Prior Publication Data

US 2005/0116005 A1 Jun. 2, 2005

(51) Int. Cl.[7] .............................................. B65H 20/00
(52) U.S. Cl. ........................ 226/97.1; 406/193; 406/144
(58) Field of Search ........................... 226/97.1, 97.4, 226/97.2, 97.3; 406/139, 140, 144

(56) References Cited

U.S. PATENT DOCUMENTS

| | | | | |
|---|---|---|---|---|
| 3,762,772 A | * | 10/1973 | Fuss | 406/1 |
| 4,147,392 A | * | 4/1979 | Fuss | 406/39 |
| 4,167,235 A | * | 9/1979 | Green | 222/105 |
| 4,197,037 A | * | 4/1980 | Dede | 406/128 |
| 4,329,840 A | * | 5/1982 | Gasser et al. | 57/279 |
| 4,422,565 A | * | 12/1983 | Reba | 226/97.4 |
| 4,655,873 A | * | 4/1987 | Oly | 156/502 |
| 6,089,795 A | * | 7/2000 | Booth | 406/43 |
| 6,428,246 B1 | * | 8/2002 | Landrum | 406/197 |
| 6,453,644 B1 | * | 9/2002 | Baker | 53/403 |
| 6,519,916 B1 | | 2/2003 | Brown | |

* cited by examiner

Primary Examiner—Joe Dillon, Jr.
(74) Attorney, Agent, or Firm—Hoffmann & Baron, LLP

(57) ABSTRACT

A conveying a chain of air-filled packing pillows to a selected position includes a generally upstanding duct, a support for supporting the device on a surface, and a pump positioned adjacent to the surface for supplying air to the device. The duct has an air inlet end connected in fluid communication with the pump, an outlet end, and an entrance aperture positioned downstream from the pump and the air inlet end for receiving the chain of air-filled packing pillows. When the pump is activated and the chain of air-filled packing pillows is inserted through the entrance aperture, the chain of air-filled packing pillows is conveyed upwardly through the duct in a longitudinal direction relative to the chain, and directed to arrive at the selected position.

19 Claims, 4 Drawing Sheets

Section A-A

Section A-A

CONVEYOR FOR AIR-FILLED PACKING PILLOWS

FIELD OF THE INVENTION

The present invention relates to the field of air-filled packing pillows, and more particularly to a conveyor for conveying chains of such pillows from a machine used for their manufacture to a container used to store and transport them.

BACKGROUND OF THE INVENTION

U.S. Pat. No. 6,519,916 to Brown describes a method by which strings of air-filled packaging pillows may be manufactured (by reference to U.S. Pat. No. 5,873,215 directed to a machine for this purpose). A length of flattened tubing is perforated, the perforations forming lines perpendicular to the longitudinal direction of the tubing, the lines being spaced at regular intervals. Air is injected through these perforations, and the tubing is then sealed to form sections in which the injected air is trapped. These air-filled sections comprise the packing pillows, such that the result of the manufacturing operation is a continuous chain of air-filled packing pillows.

In the course of manufacturing these air-filled packing pillows, it is often desirable to transport the pillows from the machine that makes them, which is often located on the floor of the manufacturing facility, to a container such as a storage bag or hopper, the inlet of which is elevated significantly from the floor. For example, the container may be suspended from a ceiling-mounted rail system for moving these containers about the factory, or may be elevated to permit air-filled packing pillows to be withdrawn from an aperture in the bottom of the container for use in packing articles. Thus, to transport the chain of air-filled packing pillows to an elevated mouth of a container, a conveyor device is desirable.

U.S. Pat. No. 6,519,916 to Brown describes a system and method for conveying these air-filled packing pillows from the machine in which they are made. In particular, Brown discloses the use of an elongated duct, with a plenum chamber (pressurized by a blower to a pressure greater than the normal atmospheric pressure in the duct) positioned along the length of the duct under the duct. This plenum chamber has a plurality of louvers which direct the air in a generally forward direction. In operation, the air exhausted from the plurality of louvers pushes against the relatively lightweight chain of air-filled packing cushions, conveying the chain forward through the duct to a desired location.

The apparatus and system disclosed by Brown is complicated, and more difficult to manufacture than an ordinary duct because of the need for an extended plenum chamber having a plurality of louvers. Accordingly, it is desirable to provide a conveyor for a chain of air-filled packing pillows, which is easier and less costly to manufacture than the system described by Brown.

Additionally, the conveyor disclosed by Brown is shown and described as either being suspended from a ceiling by cables, or supported by a wheeled frame. Both of these methods add complexity and manufacturing cost, and the wheeled frame occupies the floor space underneath the duct preventing that space from being used for other purposes. Accordingly, it is also desirable to provide a more simple support system for such a conveyor.

SUMMARY OF THE INVENTION

In one aspect, the present invention is directed to a conveyor device for conveying a chain of air-filled packing pillows in a longitudinal direction relative to the chain, the device comprising a support for supporting the conveyor device on a surface, a pump for supplying air, the pump positioned adjacent to the surface, a generally upwardly extending duct, the duct having an air inlet end and an outlet end, the air inlet end of the duct connected in fluid communication with the pump, the duct having an entrance aperture for receiving the chain of air-filled packing pillows, the entrance aperture positioned downstream from the pump and the air inlet end, so that when the pump is activated and the chain of air-filled packing pillows is inserted through the entrance aperture, the chain of air-filled packing pillows is conveyed upwardly through the duct to a selected position. In another aspect, the present invention is directed to conveyor device for conveying a chain of air-filled packing pillows in a longitudinal direction relative to the chain, the device comprising a blower unit, an upstanding elongated duct, the duct having an air inlet positioned adjacent said blower, an outlet and an entrance aperture for the chain positioned downstream of the air inlet and upstream of the outlet; and a deflector positioned proximate to the outlet of the upstanding duct.

DETAILED DESCRIPTION OF THE INVENTION

Figure 1:
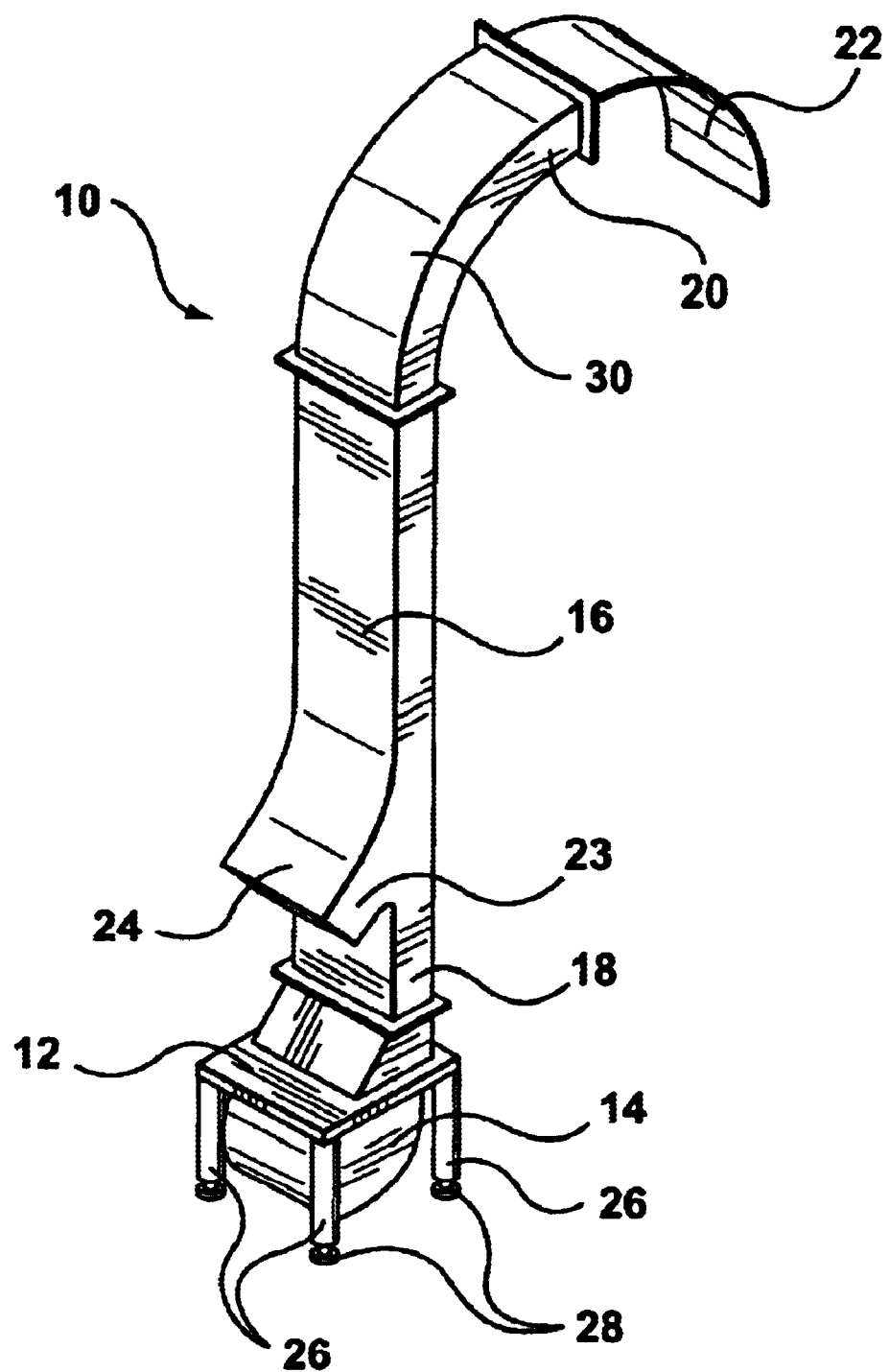
FIG. 1 is a perspective view of an embodiment of a conveyor in accordance with the present invention.

Referring now to FIG. 1, a conveyor according to the present invention is indicated generally at 10. The conveyor 10 has a support 12 for supporting the conveyor 10 on a surface 11 (shown in FIG. 2), and a pump 14 positioned proximate to the surface 11. The conveyor has a generally upwardly extending duct 16 having an air inlet end 18 in fluid communication with the pump 14, and an outlet end 20. It will be appreciated by one skilled in the art that duct 16 need not be precisely normal to surface 11, as long as it extends generally upwards.

Figure 2:
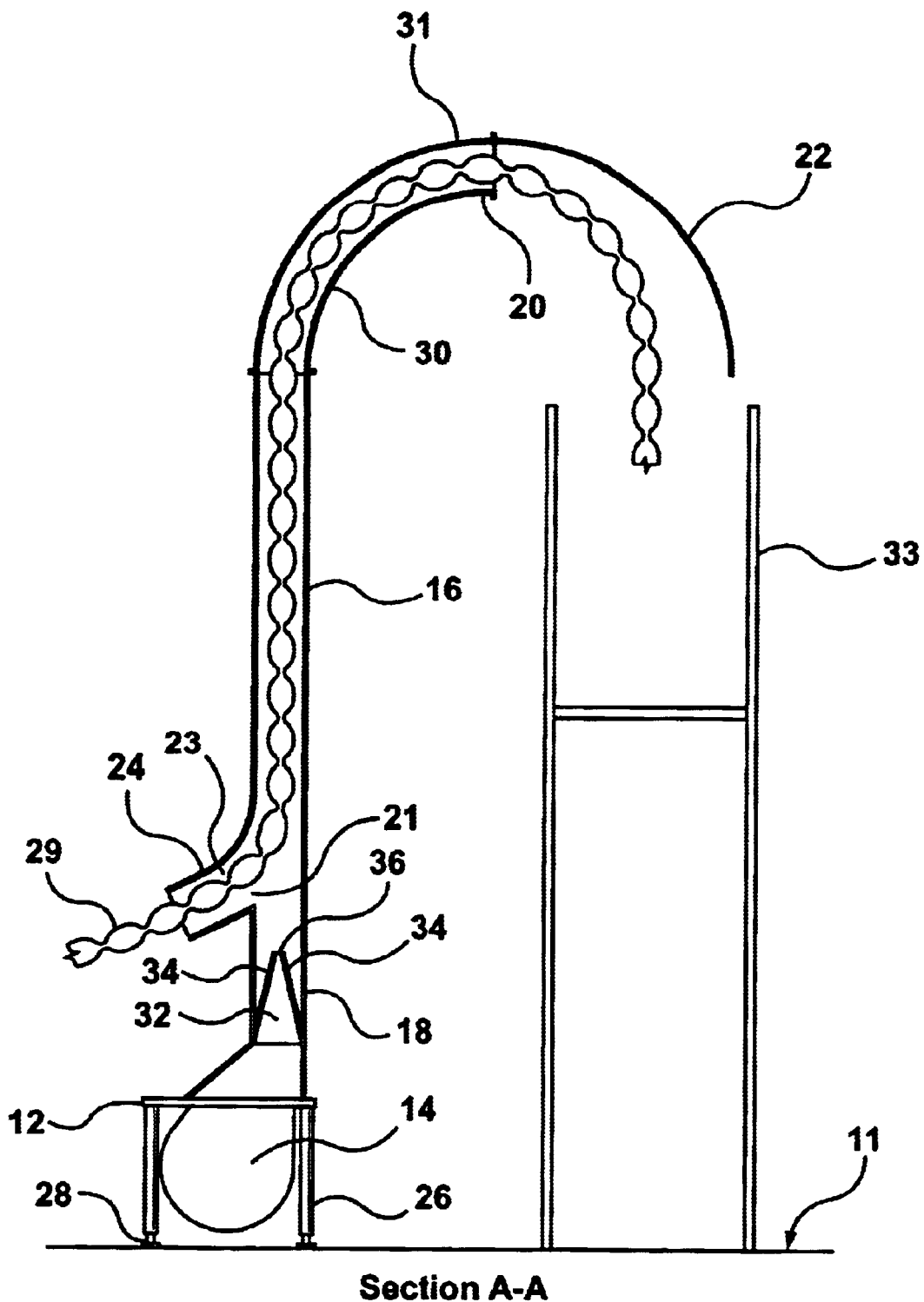
FIG. 2 is a side cross-sectional view of the conveyor of FIG. 1.

As shown in FIG. 2, conveyor 10 includes an entrance aperture 21 located in duct 16 downstream from pump 14, and also has a deflector 22 positioned adjacent outlet end 20. Conveyor 10 also includes an entrance duct 23 in fluid communication with entrance aperture 21. Entrance duct 23 preferably extends at a downward angle from entrance aperture 21, toward the machine (not shown) which manufactures the air filled packing pillows so as to provide a guide for feeding a chain 29 of air filled packing pillows into entrance aperture 21 and thereby into duct 16. The precise angular orientation of entrance duct 23 will depend on the height and location of the particular machine used to produce the air-filled packing pillows. Upper plate 24 of entrance duct 23 is curved to prevent chain 29 from snagging as it proceeds into duct 16.

Referring again to FIG. 1, in the embodiment illustrated, support 12 has four legs 26 which have feet 28 which contact the surface 11 on which conveyor 10 rests, and pump 14 is positioned within a notional parallelepiped defined by legs 26 (although an upper portion of pump 14 may extend above the parallelepiped). Duct 16 and deflector 22 may be constructed of relatively thin sheet metal. Alternatively, duct 16 and deflector 22 may be constructed of plastic, or any other suitably rigid, lightweight material. Deflector 22 preferably has some flexibility, rather than being completely rigid. Because pump 14 is heavy, relative to duct 16 and deflector 22, the center of gravity of conveyor 10 may be close to the surface 11 on which conveyor 10 is supported and will not be laterally displaced from within the four legs 26, in that a line perpendicular to the surface 11 and through the center of gravity of conveyor 10 does not pass outside the perimeter defined by the four feet 28. Thus, conveyor 10 is essentially self-supporting on support 12. In particular, by making support 12, in conjunction with pump 14, sufficiently heavy, conveyor 10 will not require additional support under or above duct 16, other than support 12, as long as duct 16 is upstanding. In this sense, the terms "upstanding" and "upwardly extending" are not limited to precisely vertical, but encompasses deviations of up to several degrees from vertical. A conveyor 10 in accordance with the present invention is essentially self-supporting and does not require additional support structures, which may eliminate the need for costly and complex frame and ceiling support structures. If, however, it is decided to include longer horizontal sections, then only the weight of these extra horizontal sections needs to be supported.

Referring now to FIG. 2, it will be seen that a chain 29 of air-filled packing pillows enters conveyor 10 through entrance duct 23, and then proceeds through entrance aperture 21 into duct 16. In the embodiment illustrated, duct 16 has a curved upper portion 30, and a generally horizontal portion 31 terminating at an outlet end 20. Curved upper portion 30 assists in changing the longitudinal direction of the chain 29 of air-filled packing pillows from generally vertical to generally horizontal so that the chain 29 can be conveyed for a short distance in the horizontal direction (i.e. toward the elevated mouth of a container, which cannot occupy the same space as duct 16). Upon emerging from outlet end 20, the chain 29 of air-filled packing pillows is directed by deflector 22, under the influence of the air stream generated by pump 14 as well as the effect of gravity, toward the desired location beneath outlet end 20. A container 33 can be positioned beneath the outlet end 22 to hold the chain 29 of air-filled packing pillows. The container 33 may be supported on legs on the surface 11 or from overhead.

Deflector 22 may be curved. The use of a curved deflector 22 assists in directing the chain 29 of air-filled packing pillows downward (in conjunction with gravity) when it emerges from outlet end 20 of duct 16. This reduces the likelihood that the air stream generated by pump 14 will convey the chain 29 of air filled packing pillows too far horizontally, such that they overshoot the mouth of a container into which they were intended to be conveyed. We have also found that the deflector 22 assists in attenuation of the noise generated by the air leaving the duct 16.

In a further preferred embodiment, duct 16 comprises curved upper portion 30 (as described above) and deflector 22 is also curved. Still more preferably, each of curved upper portion 30 and curved deflector 22 have a radius of curvature that is approximately equal, so that the curvature of deflector 22 can be said to be a continuation of the curvature of curved upper portion 30. In a particular preferred embodiment, curved upper portion 30 and deflector 22 together form a complete arch.

Preferably, duct 16 has a rectangular cross-section, as this simplifies the manufacturing process for duct 16. It is to be understood, however, that duct 16 may have other cross sectional shapes, such as oval. Duct 16 may be manufactured by any suitable method.

Figure 3:
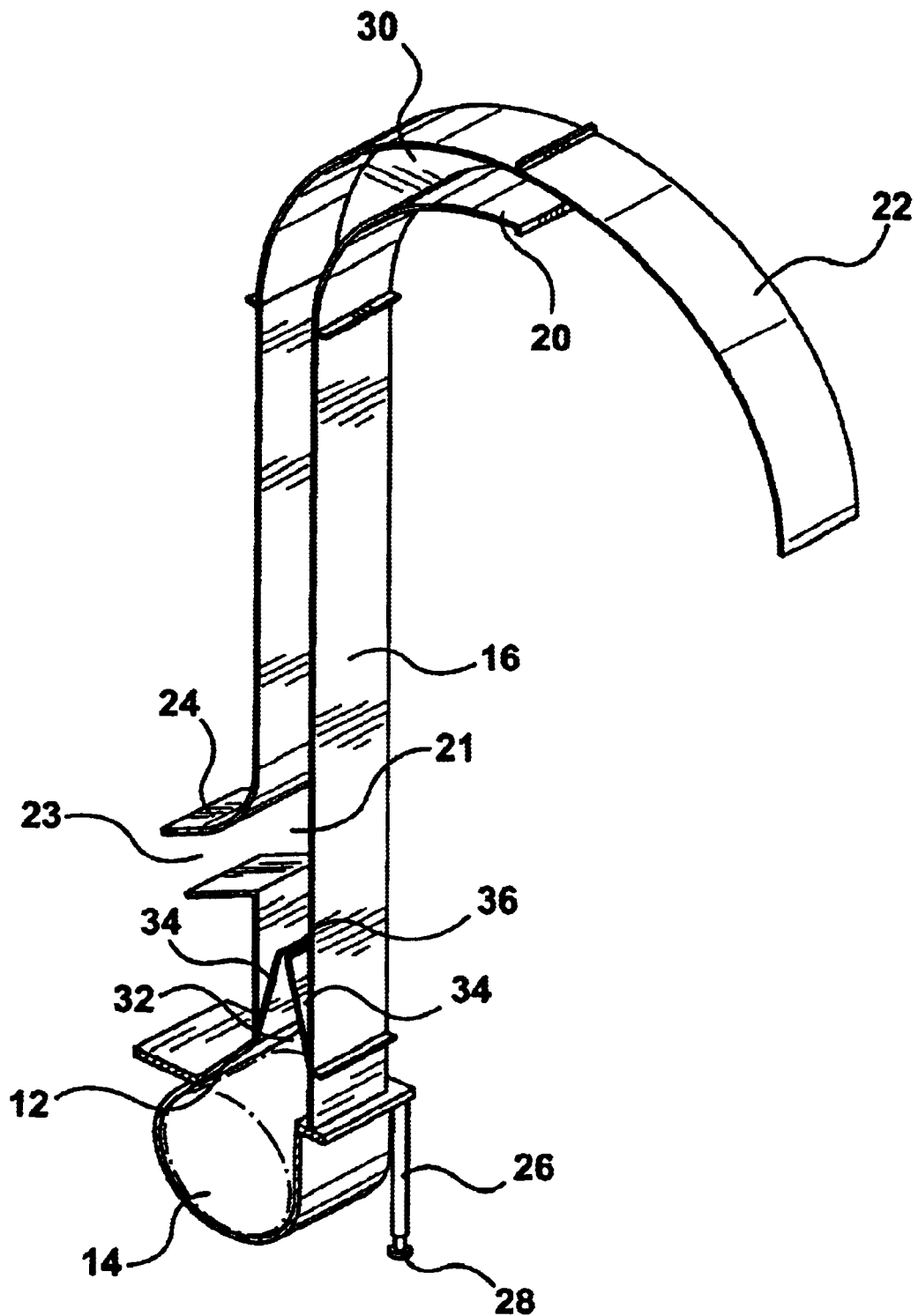
FIG. 3 is a perspective cross-sectional view of the conveyor of FIG. 1.
Figure 3A:
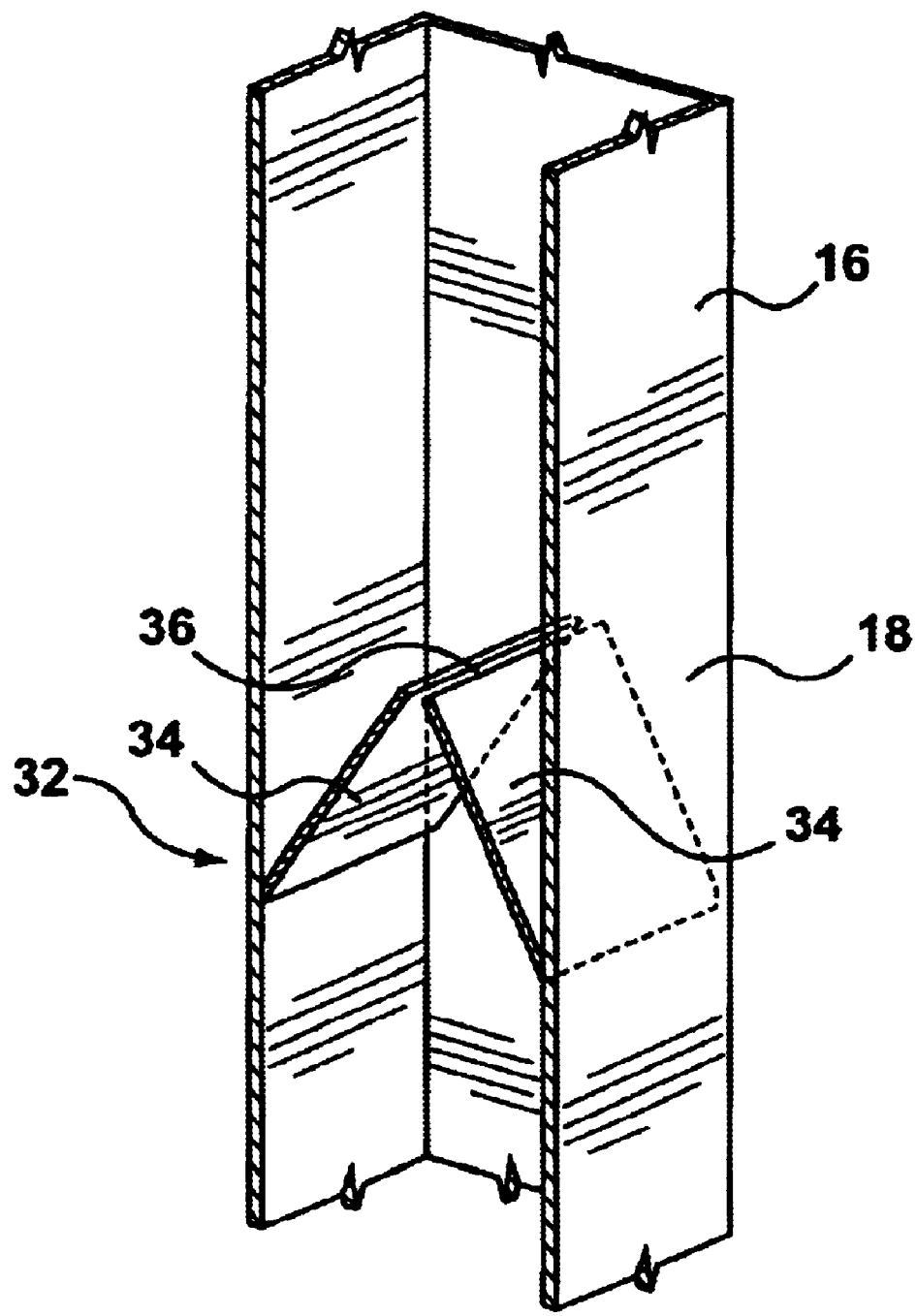
FIG. 3A is a detailed perspective cross-sectional view of a nozzle disposed within the conveyor of FIG. 1.

Referring to FIGS. 2, 3 and 3A, in the embodiment illustrated, the air inlet end 18 of duct 16 has a nozzle 32 for increasing the velocity of the air stream generated by pump 14 before it contacts the chain 29 of air-filled packing pillows. Nozzle 32 is positioned downstream from pump 14 and upstream of entrance aperture 21. FIG. 3A shows a more detailed cross-sectional perspective view of a preferred embodiment of a nozzle. In particular, nozzle 32 comprises two restricting plates 34. Restricting plates 34 are angled relative to the longitudinal direction of duct 16 so that they converge to define slot 36 through which air flows. Restricting plates 34 are secured in a generally air impervious manner to inside walls of air inlet 18 of duct 16.

Referring to FIG. 2, in operation, pump 14 is activated and blows air into duct 16 and through slot 36. A chain 29 of air-filled packing pillows is fed through entrance duct 23 into entrance aperture 21, and is conveyed along duct 16 by the air stream generated by pump 14 so that the chain 29 of pillows exits duct 16 at outlet end 20 and is directed by deflector 22 toward (for example) an elevated container positioned thereunder. More particularly, pump 14 acts as a blower to blow air into the adjacent air inlet 18 of duct 16, past the entrance aperture 21, positioned downstream of duct 16, through to the outlet end 20 of duct 16 and toward the deflector 22 adjacent outlet end 20, so that the stream of air running through duct 16 will convey the chain of air filled packing pillows 29 entering entrance aperture 21 upward such that the chain of air-filled packing pillows 29 will exit through outlet end 20.

What is claimed is:

1. A conveyor device for conveying a chain of air-filled packing pillows in a longitudinal direction relative to the chain, the device comprising:

a support having a plurality of legs for supporting said conveyor device on a surface;

a pump for supplying air, said pump positioned adjacent to said surface and is located vertically within a volume defined by said plurality of legs so that said conveyor is self supporting;

a generally upwardly extending duct, said duct having an air inlet end and an outlet end, said air inlet end of said duct connected in fluid communication with said pump;

said duct having an entrance aperture for receiving said chain of air-filled packing pillows, said entrance aperture positioned downstream from said pump and said air inlet end;

so that, when said pump is activated and said chain of air-filled packing pillows is inserted through said entrance aperture, said chain of air-filled packing pillows is conveyed upwardly through said duct to a selected position.

2. The conveyor device of claim 1, further comprising a nozzle positioned downstream from said pump and said air inlet end and upstream from said entrance aperture.

3. The conveyor device of claim 1 further comprising a deflector for directing said chain of pillows in exiting said duct, said deflector positioned adjacent said outlet end of said duct.

4. The conveyor device of claim 3 further comprising a nozzle positioned downstream from said pump and said air inlet end and upstream from said entrance aperture.

5. The conveyor device of claim 3 wherein said deflector directs said chain of pillows toward a container positioned beneath said deflector.

6. The conveyor device of claim 5 further comprising a nozzle positioned downstream from said pump and said air inlet end and upstream from said entrance aperture.

7. The conveyor device of claim 3 wherein said deflector is curved.

8. The conveyor device of claim 7 further comprising a nozzle positioned downstream from said pump and said air inlet end and upstream from said entrance aperture.

9. The conveyor device of claim 7 wherein said deflector directs said chain of pillows toward a container positioned beneath said deflector.

10. The conveyor device of claim 9 further comprising a nozzle positioned downstream from said pump and said air inlet end and upstream from said entrance aperture.

11. The conveyor device of claim 1, where said pump further comprises:
    a blower unit positioned adjacent said air inlet; and
    a deflector positioned proximate to said outlet of said upstanding duct for directing said chain of air-filled packing pillows.

12. The conveyor device of claim 11 wherein said deflector is curved.

13. The conveyor device of claim 12 further comprising a nozzle positioned downstream from said air inlet end and upstream from said entrance aperture.

14. The conveyor device of claim 11 wherein said duct has a curved upper portion.

15. The conveyor device of claim 14 further comprising a nozzle positioned downstream from said air inlet end and upstream from said entrance aperture.

16. The conveyor device of claim 14 further comprising a nozzle positioned downstream from said air inlet end and upstream from said entrance aperture.

17. The conveyor device of claim 14 wherein said deflector is curved.

18. The conveyor device of claim 17 further comprising a nozzle positioned downstream from said air inlet end and upstream from said entrance aperture.

19. A conveyor device for conveying a chain of air-filled packing pillows in a longitudinal direction relative to the chain, the device comprising:
    support means for supporting said conveyor device on a surface and defining a volume;
    a pump for air, said pump being located vertically within said volume defined by said support means so that said conveyor is self supporting;
    a generally upwardly extending duct, said duct having an air inlet end and an outlet end, said air inlet in of said duct connected in fluid communication with said pump;
    said duct having an entrance aperture for receiving said chain of air-filled packing pillows, said entrance aperture positioned downstream from said pump and said air inlet end;
    so that, when said pump is activated and said chain of air-filled packing pillows is inserted through said entrance aperture, said chain of air-filled packing pillows is conveyed upwardly through said duct to a selected position.

* * * * *

UNITED STATES PATENT AND TRADEMARK OFFICE
CERTIFICATE OF CORRECTION

PATENT NO. : 6,910,610 B2
DATED : June 28, 2005
INVENTOR(S) : Bartlett et al.

It is certified that error appears in the above-identified patent and that said Letters Patent is hereby corrected as shown below:

Column 6,
Line 18, "said air inlet in of said" should read -- said air inlet end of said --.

Signed and Sealed this

Twentieth Day of December, 2005

JON W. DUDAS
*Director of the United States Patent and Trademark Office*

UNITED STATES PATENT AND TRADEMARK OFFICE
CERTIFICATE OF CORRECTION

PATENT NO. : 6,910,610 B2
DATED : June 28, 2005
INVENTOR(S) : Bartlett et al.

It is certified that error appears in the above-identified patent and that said Letters Patent is hereby corrected as shown below:

Column 6,
Line 14, "a pump for air, said pump being…" should read -- a pump for supplying air, said pump being… --.

Signed and Sealed this

Seventeenth Day of January, 2006

JON W. DUDAS
*Director of the United States Patent and Trademark Office*